United States Patent
Wu et al.

(10) Patent No.: US 11,487,863 B2
(45) Date of Patent: Nov. 1, 2022

(54) MULTIFACTOR AUTHENTICATION SERVICE

(71) Applicant: Citrix Systems, Inc., Fort Lauderdale, FL (US)

(72) Inventors: Hao Wu, Nanjing (CN); Tianze Jiang, Nanjing (CN); Taodong Lu, Nanjing (CN); Yihong Wu, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 275 days.

(21) Appl. No.: 16/861,445

(22) Filed: Apr. 29, 2020

(65) Prior Publication Data

US 2021/0334352 A1    Oct. 28, 2021

Related U.S. Application Data

(63) Continuation of application No. PCT/CN2020/086025, filed on Apr. 22, 2020.

(51) Int. Cl.
*H04L 9/40* (2022.01)
*G06F 21/43* (2013.01)

(52) U.S. Cl.
CPC .............. *G06F 21/43* (2013.01); *H04L 63/08* (2013.01); *H04L 63/0876* (2013.01); *H04L 2463/082* (2013.01); *H04L 2463/121* (2013.01)

(58) Field of Classification Search
CPC ..... G06F 21/43; H04L 63/08; H04L 63/0876; H04L 63/0846; H04L 63/18;
(Continued)

(56) References Cited

U.S. PATENT DOCUMENTS

| | | | |
|---|---|---|---|
| 10,360,367 B1 * | 7/2019 | Mossoba | H04L 63/08 |
| 2009/0187759 A1 * | 7/2009 | Marsico | H04L 63/0846 |
| | | | 713/181 |

(Continued)

FOREIGN PATENT DOCUMENTS

| | | |
|---|---|---|
| CN | 104036164 A | 9/2014 |
| CN | 105791246 A | 7/2016 |
| CN | 105991519 A | 10/2016 |

OTHER PUBLICATIONS

International Search Report and Written Opinion dated Jan. 13, 2021 for Application No. PCT/CN2020/086025 filed Apr. 22, 2020; pp. 9.

*Primary Examiner* — Khoi V Le
(74) *Attorney, Agent, or Firm* — Hoffman Warnick LLC

(57) ABSTRACT

A system and method for providing multifactor authentication. A disclosed method includes receiving a request at a server to launch a new session for an application on a client device, generating a plurality of codes, each of the plurality of codes associated with a respective identifier, and forwarding the plurality of codes via a short messaging service (SMS) message to a user associated with the client device. The method further includes sending the respective identifier associated with a given code of the plurality of codes to the application and receiving a submitted code entered into the application from the client device. Once received, the method compares the submitted code with the given code associated with the respective identifier and authenticates the user in response to the submitted code matching the given code.

16 Claims, 6 Drawing Sheets

(58) Field of Classification Search
CPC ....... H04L 2463/082; H04L 2463/121; H04W 12/06; H04W 12/72
See application file for complete search history.

(56) References Cited

U.S. PATENT DOCUMENTS

2014/0173125 A1\* 6/2014 Selvanandan ......... H04W 12/06
709/227
2019/0215904 A1\* 7/2019 Wu ..................... H04W 12/069

\* cited by examiner

MULTIFACTOR AUTHENTICATION SERVICE

BACKGROUND OF THE DISCLOSURE

Short message service (SMS) based authentication is widely used to provide multifactor authentication for granting access to resources on a network. In a typical scenario, in order to launch a network session from a client device, a user must first login to an application from the client device with a user name and password, which in turn triggers an SMS message such as a code to be sent to a cell phone associated with the user. The user is then asked to enter the code into a screen generated by the application. If the user enters the correct code, the user is authenticated and access is provided for the application.

BRIEF DESCRIPTION OF THE DISCLOSURE

Aspects of this disclosure provide a system and method for providing enhanced SMS based multifactor authentication.

A first aspect of the disclosure provides a computerized method for providing multifactor authentication. The method includes receiving a request at a server to launch a new session for an application on a client device, generating a plurality of codes in which each of the plurality of codes is associated with a respective identifier, and forwarding the plurality of codes via a short messaging service (SMS) message to a user associated with the client device. The method further includes sending the respective identifier associated with a given code of the plurality of codes to the application and receiving a submitted code entered into the application from the client device. Once received, the method compares the submitted code with the given code associated with the respective identifier and authenticates the user in response to the submitted code matching the given code.

A second aspect of the disclosure provides a server having a memory and a processor configured to implement a multifactor authentication service according to a process. The process includes receiving a request at the server to launch a new session for an application on a client device, generating a plurality of codes in which each of the plurality of codes is associated with a respective identifier, and forwarding the plurality of codes via a short messaging service (SMS) message to a user associated with the client device. The method further includes sending the respective identifier associated with a given code of the plurality of codes to the application and receiving a submitted code entered into the application from the client device. The process then compares the submitted code with the given code associated with the respective identifier and authenticates the user in response to the submitted code matching the given code.

A third aspect of the disclosure provides a method implemented by an application stored in memory and executable by a processor on a client device that provides multifactor authentication. The method includes submitting a request to a server to launch a new session for the application running on the client device, receiving a plurality of codes via a short messaging service (SMS) application associated with the client device and receiving an identifier that specifies one of the plurality of codes. The method further includes rendering a request screen requesting a code associated with the identifier, receiving an entered code from a user, and forwarding the entered code to the server for authentication.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for implementing an enhanced short message service (SMS) based multifactor authentication service. While current technologies for implementing SMS based multifactor authentication greatly improve security, they remain vulnerable in various scenarios. For example, if the device that receives the SMS message is hijacked with a virus or the like, a hacker can gain full access to all SMS messages on the device, and potentially gain access to network resources. Another potential vulnerability can result when a hacker monitors packets, e.g., with the use of a "sniffer" that can access a wireless or cellular signal, to obtain an SMS authorization code. This is particularly problematic in public areas such as airports and the like. In still other scenarios, the SMS authorization codes, which often contain only a few digits, can potentially be read directly from the user device by a nearby human or artificial intelligence system.

The present approach resolves such technical problems by utilizing an enhanced SMS authentication mechanism. In particular, rather than sending a single SMS code to the user, multiple codes are sent to the user within one SMS message. The user selects one or more of the received codes to enter based on one-time instructions from the application and server to complete the authentication. This mechanism increases the difficulty for a hacker to break the SMS based authentication, even if the SMS message is sniffled or hijacked.

Figure 1:
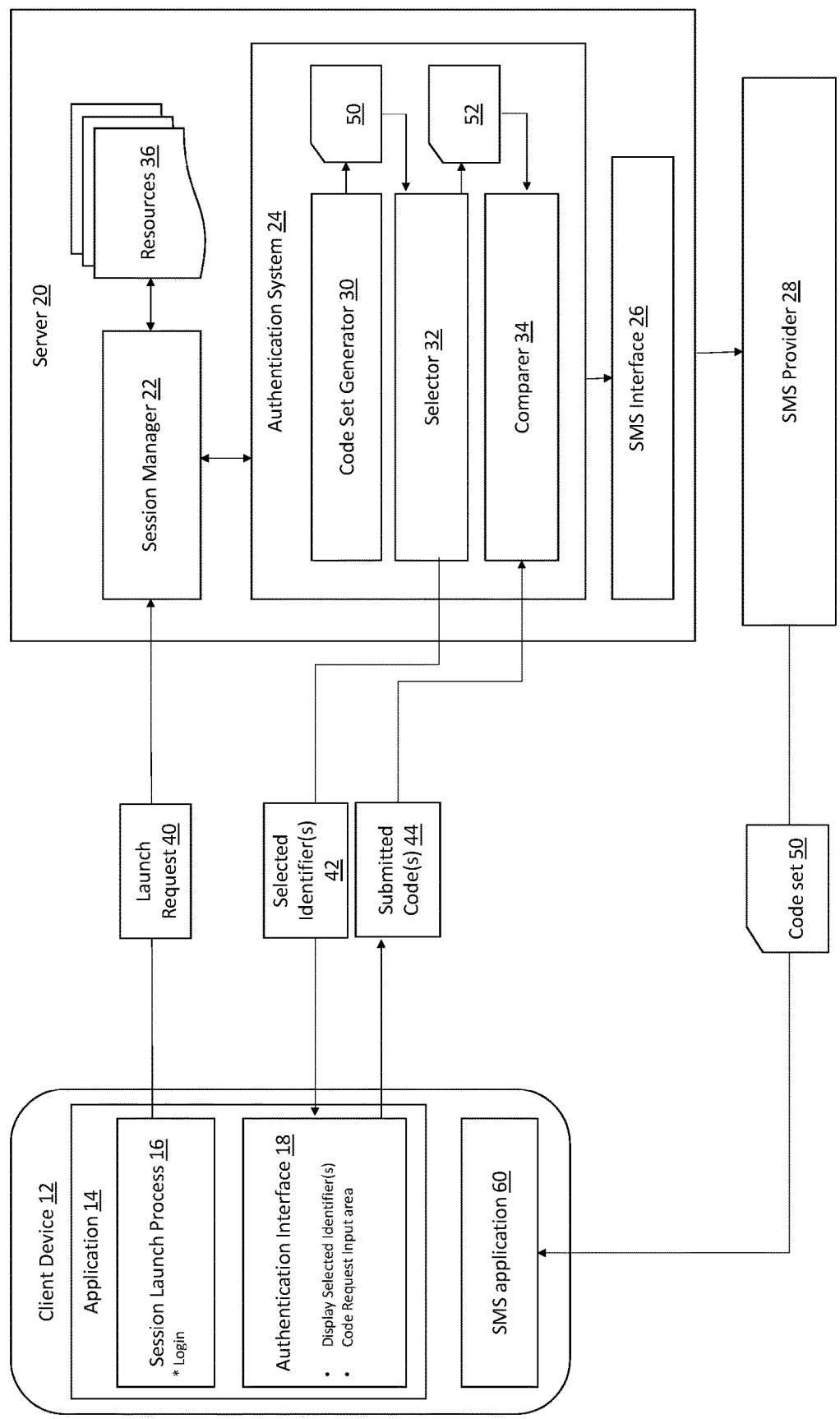
FIG. 1 depicts a client server platform configured to implement an authentication process in accordance with an illustrative embodiment.

Referring to FIG. 1, a client server platform 10 is shown configured to implement an enhanced multifactor authentication service. In this embodiment, a client device 12, such as a smartphone, laptop, desktop, etc., includes an application 14 that interfaces with a server 20 to access resources 36, such as data, programs, services, etc., for the application 14. A session manager 22 controls access to the resources 36 by creating a session for the application 14, which first requires authentication by an authentication system 24.

An illustrative authentication process for application 14 is implemented as follows. Initially, a user attempts to login (e.g., entering a user name and password) via a session launch process 16, which triggers a launch request 14 to be sent to the server 20. Assuming the user name and password are verified by the authentication system 24 (e.g., using standard protocols), the authentication system 24 institutes an enhanced SMS based authentication process. First, a code set generator 30 generates a set of codes (i.e., a code set), such as: code1: FGTRXM, code2: KF4RDF, code3: MD2WE, code4: UJ321T. Codes generally include a series of alphanumeric characters that can be generated in any manner and of any length. Each code includes a respective identifier, in this case code1, code2, etc. Next, a selector 32 selects a subset of codes 52, i.e., one or more given codes that will be required for authentication. For example, selector 32 might select code2: KF4RDF and code3: MD2WE as the subset of codes 52 from the code set 50. Selector 32 can use any algorithm to select the subset of codes 52, e.g., a random number generator based process that randomly selects a subset of codes m from the n total codes.

Once the code set 50 is generated and the code subset 52 is selected, authentication system 24 outputs two separate pieces of information. Firstly, the identifiers associated with the selected subset of codes 52 (i.e., selected identifiers 42) are forwarded via the network to an authentication interface 18 in the application 14. Secondly, the entire code set 50 is forwarded via an SMS provider 28 to an SMS application 60 associated with a user of the client device 12. In the case where the client device 12 comprises a smartphone, both the application 14 and the SMS application 60 will generally reside on the same device. However, in the case of authenticating an application on a client device such as a laptop, desktop computers, etc., the SMS application 60 may reside on a device separate from client device 12. Regardless, once both pieces of information are forwarded from the authentication system 24, the authentication interface 18 renders a code request input area and asks for the subset of codes 52 associated with the selected identifier(s) 42.

For example, if the authentication interface 18 received "code2 and code3" as the selected identifiers 42, authentication interface 18 would render a request for the user to submit codes 2 and 3. The user would then look at the SMS message containing the entire code set 50, and submit only the requested codes. The submitted code(s) 44 are then forwarded to comparer 34 in the authentication system 24, which compares the submitted code(s) 44 with the subset of codes 52. If the codes match, then the application and user are authenticated and a session is created.

Figure 2B:
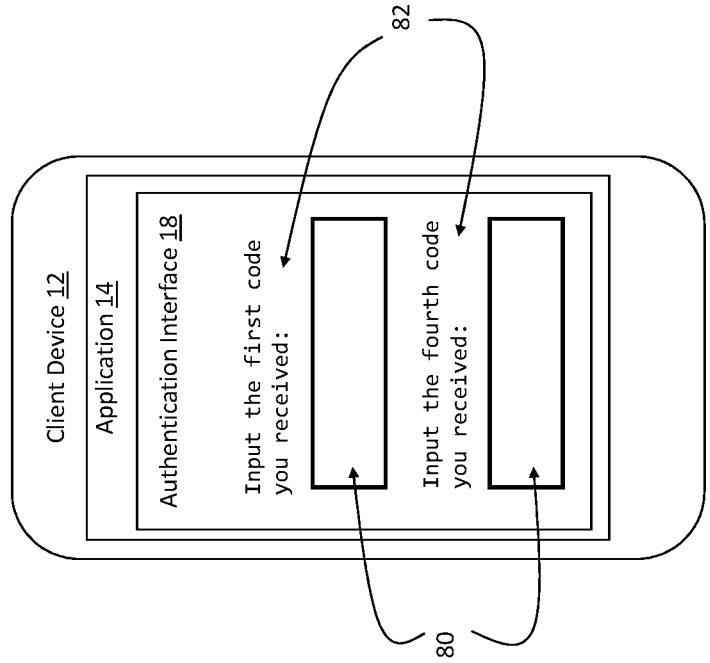
FIG. 2B depicts an authentication interface on a client device in accordance with an illustrative embodiment.
Figure 2A:
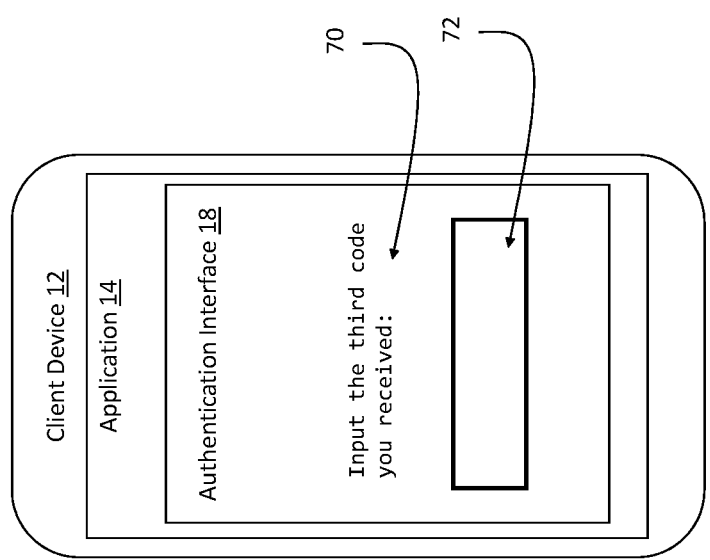
FIG. 2A depicts an authentication interface on a client device in accordance with an illustrative embodiment.

FIGS. 2A and 2B depict two illustrative code request examples rendered by application interface 18. In both examples, after initiating a login process, the user would receive and view an SMS message with a plurality of codes (not shown). In FIG. 2A, only a single code is requested by application interface 18, which is based on the received selected identifier 42 (FIG. 1). In this case, the selected identifier 42 specifies that the third code is required, which results in the request 70 being rendered, "Input the third code you received." A single submission window 72 is rendered to collect the requested code.

FIG. 2B illustrates the case where two codes are required. In this example, the selected identifiers 42 specify that both the first and fourth codes are required, which results in a multiple request 80 being rendered, "Input the first code you received" and "Input the fourth code you received." In this case, two submission windows 82 are rendered to collect the requested codes. It is understood that any interface arrangement or technology could be used to obtain requested codes, e.g., voice input, touch screen input, keyboard input, etc.

Figure 3:
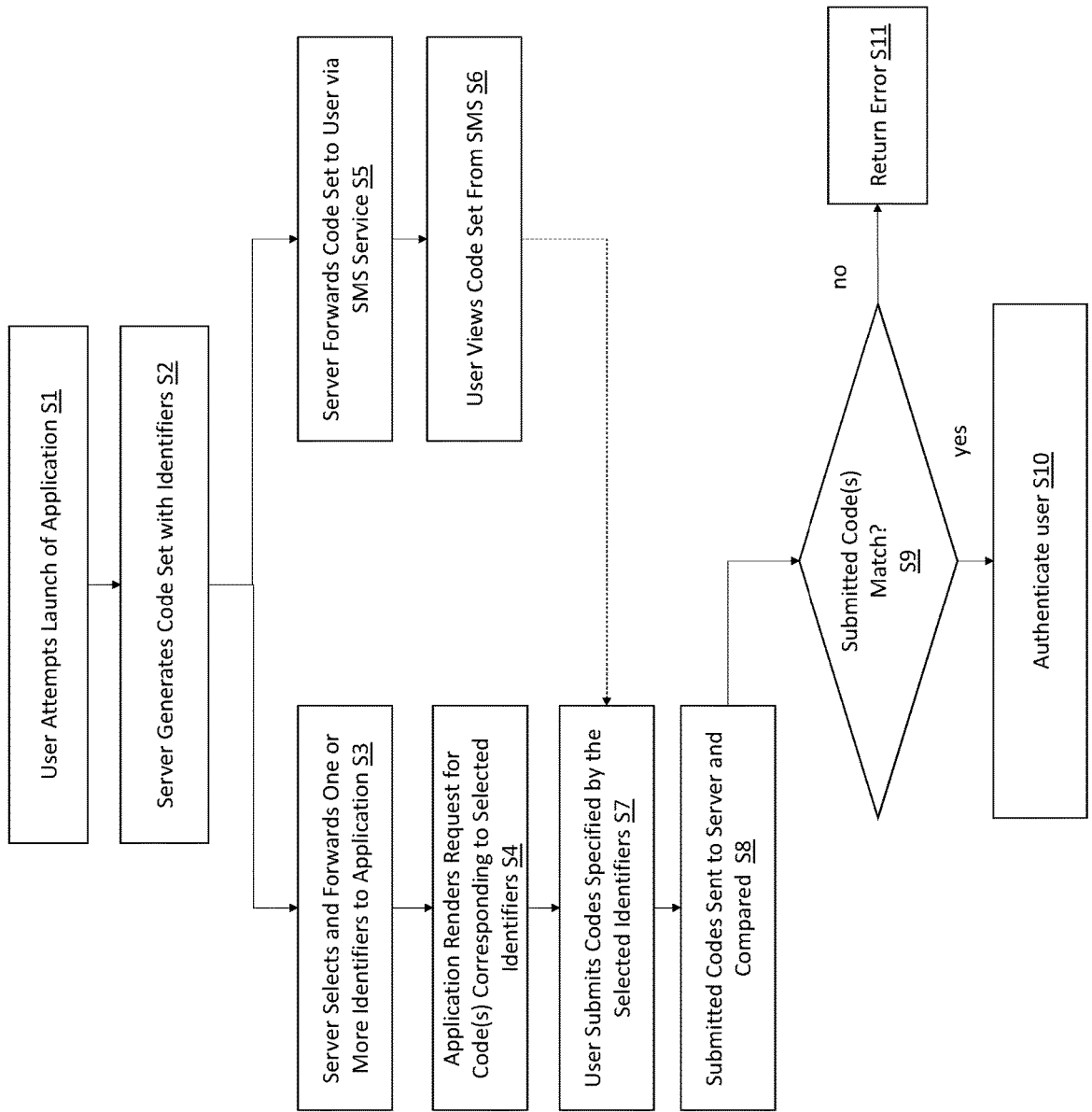
FIG. 3 depicts a flow diagram of an authentication process in accordance with an illustrative embodiment.

FIG. 3 depicts a flow diagram of an illustrative process of implementing an enhanced authentication process, with reference to FIG. 1. The flow begins at S1 when a user attempts to launch a network session from an application 14 on a client device 12 to access resources at a server 20. The attempted launch may for example occur when a user name and password are submitted, which triggers the following enhanced authentication process. At S2, the server 20 generates a code set 50 that includes a plurality of codes and a respective identifier for each code. At S3, the server 20 selects one or more of the codes and forwards their respective identifier(s) (i.e., selected identifiers 42) to application 14. At S4, the application 14 renders a request via an authentication interface 18 for one or more codes specified by the selected identifier(s) 42. During, or at about the same time the selected identifiers 42 are sent, the server 20 also forwards the complete code set 50 to the user via an SMS provider at S5, and at S6 the user views the code set 50.

At S7, the user enters the requested codes specified by the selected identifiers 42 into the application. For example, the SMS message may include five codes, and the application 14 may ask for the third code, which the user would then submit. At S8, assuming a single code was requested, the submitted code is sent to the server 20 and compared to the given code associated with the selected identifier 42. At S9, a determination is made whether the submitted code matches the given code selected at S3. If the codes match, the user is authenticated at S10. If the codes do not match, an error is returned at S11.

Determining which of the plurality of codes are required when authenticating the user may be done in any manner. In one illustrative embodiment, an encrypted algorithm can be deployed in the authentication system 24 (FIG. 1) to select an identifier (or identifiers) based on a timestamp. For instance, when the codes are generated, a timestamp can be captured and stored with the session, which can be then used as an input to the algorithm to select an identifier associated with a required code. For example, in the case where a single code is used for authentication, the identifier can be selected using a modulus operation, e.g., identifier=(timestamp) mod (number of generated codes). In the case where multiple codes are required for authentication, multiple operations may be used. For example, identifier1=(timestamp) mod (number of generated codes); identifier2=(identifier1+last digit of timestamp) mod (number of generated codes), etc.

As a further aspect, the (International Mobile Equipment Identity) IMEI of the client device 12 (FIG. 1) may be used to enhance the timestamp. For example, the IMEI of the last login can be stored, and after the timestamp is generated, the IMEI can be applied (e.g., multiplied, added, etc.) to the timestamp to create an enhanced timestamp. The enhanced timestamp can then be used to determine the identifier using the encrypted algorithm.

Figure 4:
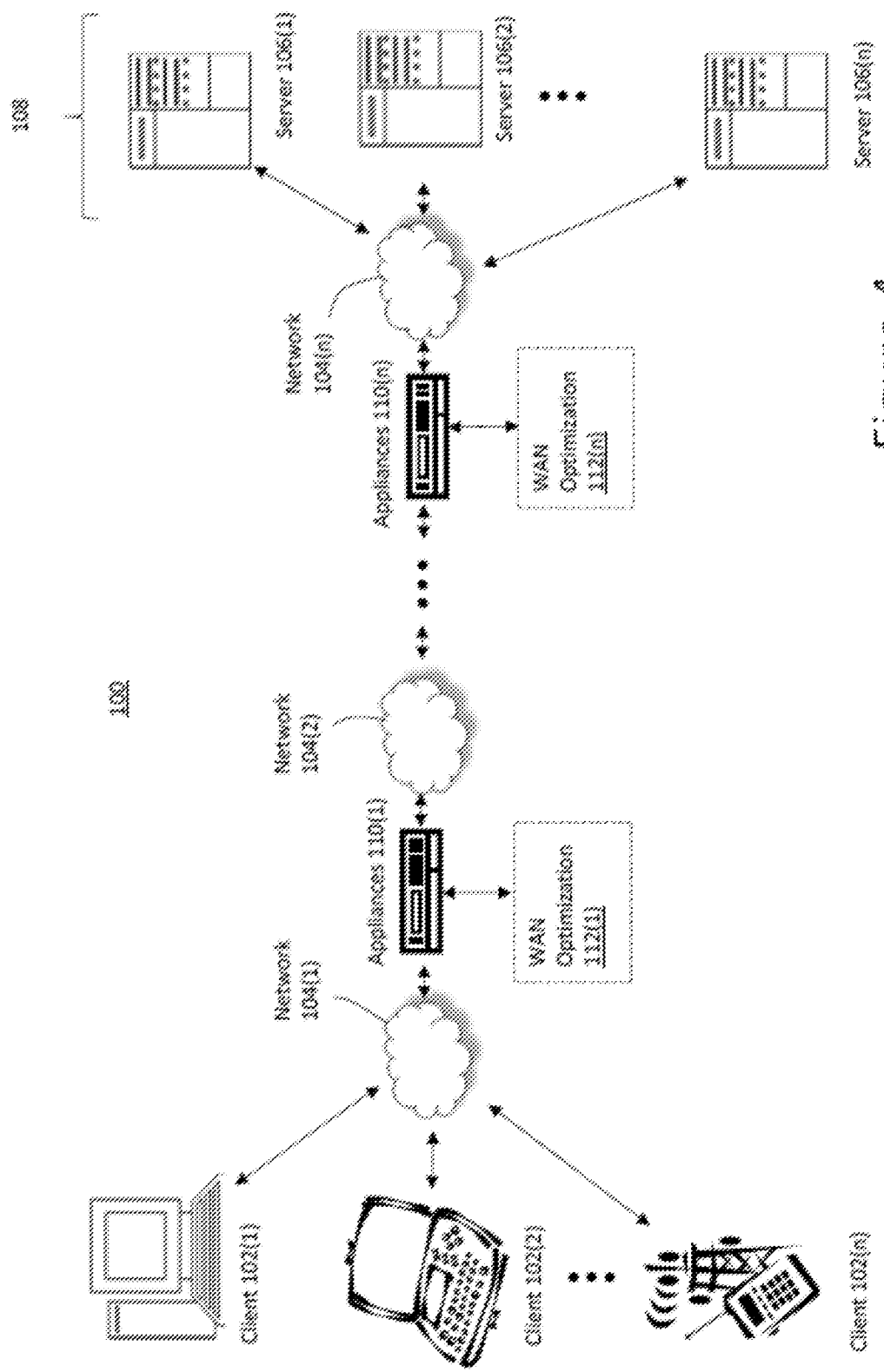
FIG. 4 depicts a network infrastructure, in accordance with an illustrative embodiment.

Referring to FIG. 4, an illustrative network environment 100 is depicted for implementing the client server platform 10. Network environment 100 may include one or more clients 102(1)-102(n) (also generally referred to as local machine(s) 102, "client devices" or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 110(1)-110n (generally referred to as appliance(s) 110 or gateway(s) 110).

Although the embodiment shown in FIG. 4 shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 4, one or more appliances 110 may be located at various points or in various communication paths of network environment 100. For example, appliance 110(1) may be deployed between two networks 104(1) and 104(2), and appliances 110 may communicate with one another to work in conjunction to, for example, accelerate network traffic between clients 102 and servers 106. In other embodiments, the appliance 110 may be located on a network 104. For example, appliance 110 may be implemented as part of one of clients 102 and/or servers 106. In an embodiment, appliance 110 may be implemented as a network device such as Citrix networking (formerly NetScaler®) products sold by Citrix Systems, Inc. of Fort Lauderdale, Fla.

As shown in FIG. 4, one or more servers 106 may operate as a server farm 108. Servers 106 of server farm 108 may be logically grouped, and may either be geographically co-located (e.g., on premises) or geographically dispersed (e.g., cloud based) from clients 102 and/or other servers 106. In an embodiment, server farm 108 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 4, in some embodiments, appliances 110 may include, be replaced by, or be in communication with, one or more additional appliances, such as WAN optimization appliances 112(1)-112(n), referred to generally as WAN optimization appliance(s) 112. For example, WAN optimization appliance 112 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 112 may be a performance enhancing proxy or a WAN optimization controller. In one embodiment, appliance 112 may be implemented as Citrix SD-WAN products sold by Citrix Systems, Inc. of Fort Lauderdale, Fla.

Figure 5:
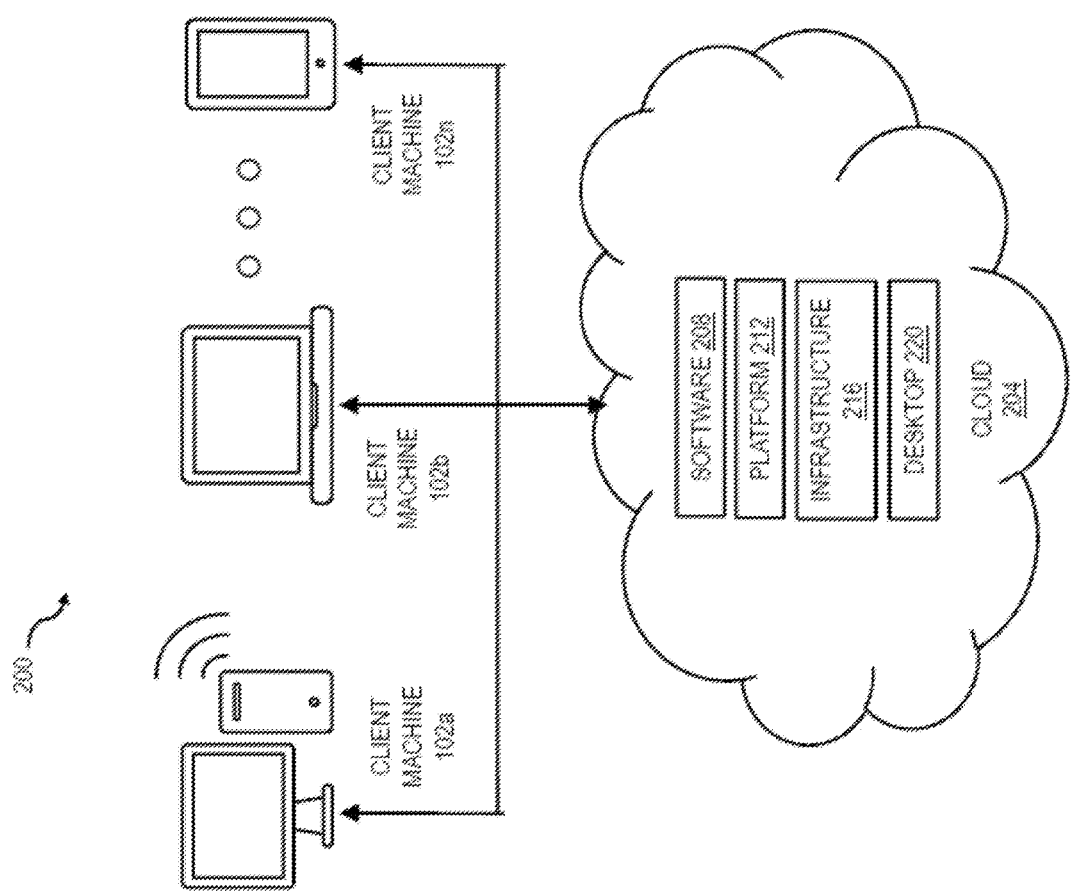
FIG. 5 depicts a cloud computing diagram, in accordance with an illustrative embodiment.

Referring to FIG. 5, a cloud computing environment 200 is depicted, which may also be referred to as a cloud environment, cloud computing or cloud network. The cloud computing environment 200 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 200, one or more clients 102a-102n (such as those described above) are in communication with a cloud network 204. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 200 may provide a private cloud serving a single organization (e.g., enterprise cloud). In another example, the cloud computing environment 200 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 200 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 200 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 200 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 200 can provide an elasticity to dynamically scale out or scale in response to different demands from one or more clients 102. In some embodiments, the cloud computing environment 200 can include or provide monitoring services to monitor, control and/or generate reports corresponding to the provided shared services and resources.

In some embodiments, the cloud computing environment 200 may provide cloud-based delivery of different types of cloud computing services, such as Software as a service (SaaS) 208, Platform as a Service (PaaS) 212, Infrastructure as a Service (IaaS) 216, and Desktop as a Service (DaaS) 220, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

In described embodiments, clients 102, servers 106, and appliances 110 and 112 may be deployed as and/or executed on any type and form of computing device, such as any desktop computer, laptop computer, or mobile device capable of communication over at least one network and performing the operations described herein. For example, clients 102, servers 106 and/or appliances 110 and 112 may each correspond to one computer, a plurality of computers, or a network of distributed computers such as computing system 300 shown in FIG. 6. Computing system 300 may for example be implemented by a cloud computing environment that employs a network of remote, hosted servers to manage, store and/or process data, and may generally be referred to, or fall under the umbrella of, a "network service."

Figure 6:
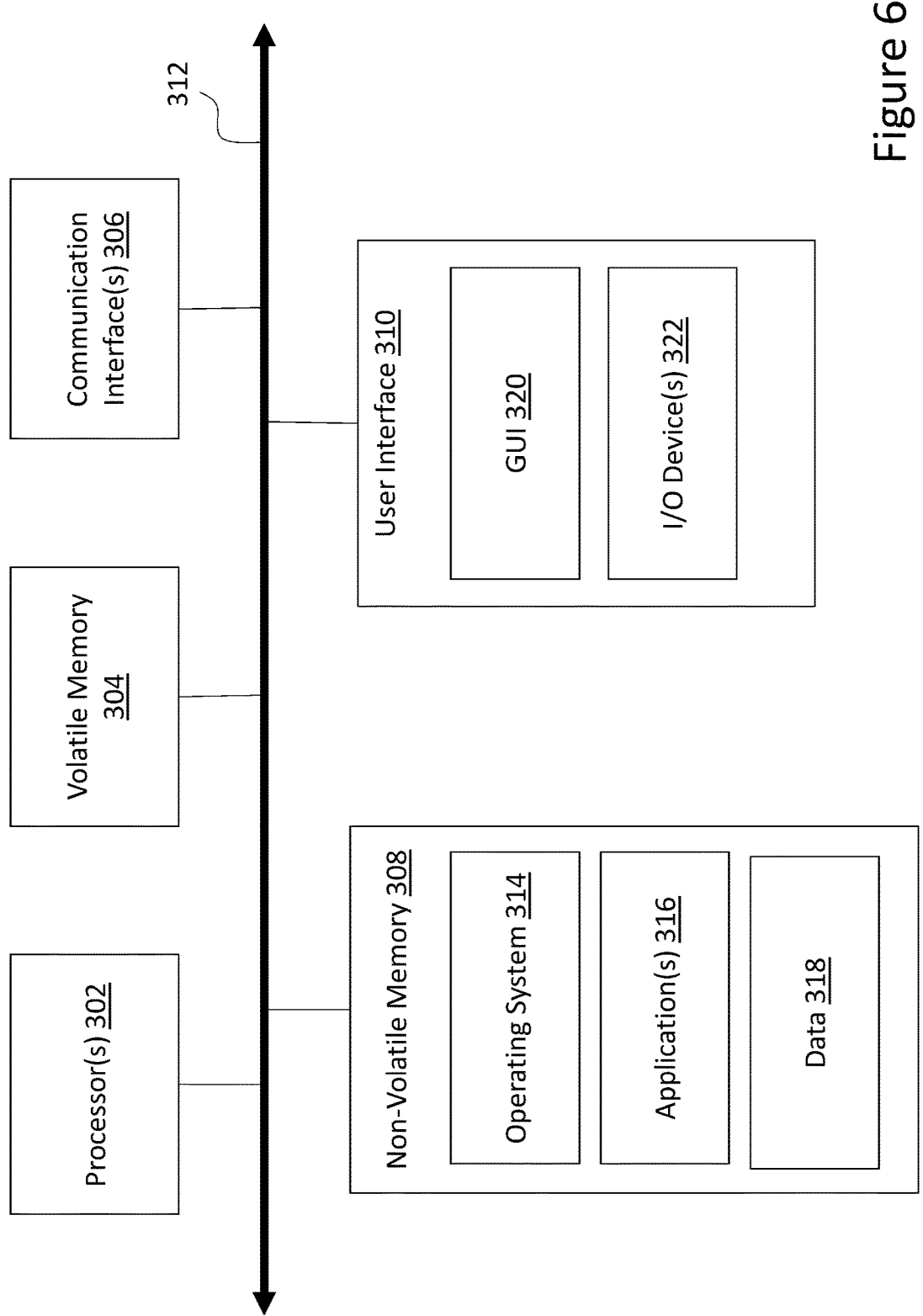
FIG. 6 depicts a computing system, in accordance with an illustrative embodiment.

Elements of the described solution may be embodied in a computing system, such as that shown in FIG. 6 in which a computer 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

We claim:

1. A computerized method for providing multifactor authentication, comprising:
    receiving a request at a server to launch a new session for an application on a client device;
    generating a plurality of codes, each of the plurality of codes associated with a respective identifier;
    recording a timestamp when the plurality of codes are generated;
    forwarding the plurality of codes via a short messaging service (SMS) message to a user associated with the client device;
    utilizing the timestamp to determine a subset of the plurality of codes that are required for authenticating the user;
    sending a set of identifiers to the application that specify the subset of the plurality of codes;
    receiving a requested set of submitted codes entered into the application from the client device;
    comparing the requested set of submitted codes with the subset of the plurality of codes specified by the set of identifiers; and
    authenticating the user in response to the requested set of submitted codes matching the subset of the plurality of codes.

2. The method of claim 1, wherein the plurality of codes are forwarded to the user via an SMS provider.

3. The method of claim 1, wherein the plurality of codes are generated as a numbered set and each respective identifier specifies a number from the numbered set.

4. The method of claim 1, wherein the timestamp further incorporates an International Mobile Equipment Identity (IMEI) value associated with the client device.

5. The method of claim 1, wherein the client device includes a phone for receiving the SMS message.

6. A server, comprising:
    a memory; and
    a processor configured to implement a multifactor authentication service according to a process that includes:
        receiving a request at the server to launch a new session for an application on a client device;
        generating a plurality of codes and recording a timestamp, each of the plurality of codes associated with a respective identifier;
        forwarding the plurality of codes via a short messaging service (SMS) message to a user associated with the client device;
        sending the respective identifier associated with a given code of the plurality of codes to the application;
        receiving a submitted code entered into the application from the client device;
        comparing the submitted code with the given code associated with the respective identifier; and
        authenticating the user in response to the submitted code matching the given code, wherein the timestamp is used to determine which of the plurality of codes is required when authenticating the user.

7. The server of claim 6, wherein the plurality of codes are forwarded to the user via an SMS provider.

8. The server of claim 6, wherein the plurality of codes are generated as a numbered set and each respective identifier specifies a number from the numbered set.

9. The server of claim 6,
    wherein the sending further includes sending a set of identifiers to the application that specify a subset of the plurality of codes;

wherein the receiving further includes receiving a requested set of submitted codes entered into the application from the client device;

wherein the comparing further includes comparing the requested set of submitted codes with the subset of the plurality of codes specified by the set of identifiers; and wherein the authenticating further includes authenticating the user in response to the requested set of submitted code matching the subset of the plurality of codes.

10. The server of claim 6, wherein the timestamp further incorporates an International Mobile Equipment Identity (IMEI) value associated with the client device.

11. The server of claim 6, wherein the client device includes a phone for receiving the SMS message.

12. A method implemented by an application stored in memory and executable by a processor on a client device that provides multifactor authentication, comprising:

submitting a request to a server to launch a new session for the application running on the client device;

receiving a plurality of codes via a short messaging service (SMS) application associated with the client device, the plurality of codes being associated with a timestamp of when the plurality of codes were generated;

receiving a plurality of identifiers that specifies a subset of the plurality of codes, wherein the subset of the plurality of codes required for authenticating the user are determined based on the timestamp;

rendering a request screen requesting the subset of the plurality of codes associated with the plurality of identifiers;

receiving a plurality of submitted codes from a user; and forwarding the plurality of submitted codes to the server for authentication.

13. The method of claim 12, further comprising:

launching the session in response to the submitted code being a match to the code associated with the identifier.

14. The method of claim 12, wherein the client device includes a smartphone configured to receive SMS messages.

15. The method of claim 13, wherein plurality of codes are received via an SMS provider.

16. The method of claim 12, wherein the plurality of codes are presented as a numbered set and the identifier specifies a number from the numbered set.

* * * * *